(12) United States Patent
Norum (10) Patent No.: US 9,323,582 B2
(45) Date of Patent: Apr. 26, 2016

(54) NODE TO NODE COLLABORATION

(75) Inventor: Inge Norum, Hafrsfjord (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 244 days.

(21) Appl. No.: 12/853,667

(22) Filed: Aug. 10, 2010

(65) Prior Publication Data

US 2011/0196909 A1 Aug. 11, 2011

Related U.S. Application Data

(60) Provisional application No. 61/233,178, filed on Aug. 12, 2009.

(51) Int. Cl.
| | | |
|---|---|---|
| G06G 7/48 | (2006.01) | |
| G06F 15/16 | (2006.01) | |
| G06F 9/50 | (2006.01) | |
| G06Q 10/10 | (2012.01) | |
| H04L 29/08 | (2006.01) | |

(52) U.S. Cl.
CPC ............ *G06F 9/5083* (2013.01); *G06Q 10/101* (2013.01); *G06Q 10/103* (2013.01); *H04L 29/0827* (2013.01)

(58) Field of Classification Search
CPC . G06Q 10/101; G06Q 10/103; H04L 29/0827
USPC .......... 709/201, 204, 217, 218; 707/103, 204; 703/10
See application file for complete search history.

(56) References Cited

U.S. PATENT DOCUMENTS

| | | | | |
|---|---|---|---|---|
| 5,924,116 A * | 7/1999 | Aggarwal et al. | ............. | 711/122 |
| 6,009,455 A * | 12/1999 | Doyle | ............. | 709/201 |
| 6,249,844 B1 * | 6/2001 | Schloss et al. | ............. | 711/122 |
| 6,438,576 B1 * | 8/2002 | Huang et al. | ............. | 709/202 |
| 7,237,006 B1 * | 6/2007 | Prell | ............. | 709/205 |
| 7,685,605 B1 | 3/2010 | Ahmed | | |
| 7,881,316 B2 * | 2/2011 | Kaler | ............. | 370/401 |
| 8,195,401 B2 * | 6/2012 | Ella et al. | ............. | 702/13 |
| 8,660,986 B2 * | 2/2014 | Iordanov et al. | ............. | 707/608 |

(Continued)

FOREIGN PATENT DOCUMENTS

| | | |
|---|---|---|
| WO | 02054224 | 7/2002 |
| WO | 2006123177 | 11/2006 |
| WO | 2007070491 | 6/2007 |

OTHER PUBLICATIONS

Weidong, Li, et al., "Application of Grid Computing in Petroleum Exploration", Fifth International Conference on Grid and Cooperative Computing Workshops 2006, GCCW 2006, pp. 27-34, Dec. 19, 2006, Hunan, ISBN 0-7695-2695-0.
Schollmeier, "A definition of peer-to-peer networking for the classification of peer-to-peer architectures and applications", Proceedings of the First International Conference on Peer-to-Peer Computing (P2P'01) 2002, IEEE.
Third Office Action issued in Canadian Patent Application No. 2,712,814 dated May 26, 2014, 8 pages.

(Continued)

*Primary Examiner* — Aftab N. Khan
(74) *Attorney, Agent, or Firm* — Colin L. Wier; Rooney Warfford; Alec McGinn (57) ABSTRACT

Implementations of node to node collaboration are described. In one technique described herein, one or more secondary nodes coupled to a primary node are identified. In one possible implementation, the secondary nodes are coupled to the primary node via a peer to peer network. Resources associated with the one or more secondary nodes can be shared with the primary node to improve a performance of an oilfield services application being run at the primary node.

13 Claims, 7 Drawing Sheets

(56) References Cited

U.S. PATENT DOCUMENTS

| | | | |
|---|---|---|---|
| 2003/0009536 A1* | 1/2003 | Henderson et al. | 709/219 |
| 2003/0097410 A1* | 5/2003 | Atkins et al. | 709/206 |
| 2003/0195932 A1* | 10/2003 | Tanabe et al. | 709/205 |
| 2004/0174822 A1* | 9/2004 | Bui | 370/252 |
| 2005/0234937 A1 | 10/2005 | Ernest | |
| 2006/0048157 A1 | 3/2006 | Dawson | |
| 2006/0161585 A1* | 7/2006 | Clarke et al. | 707/104.1 |
| 2006/0195508 A1* | 8/2006 | Bernardin et al. | 709/203 |
| 2007/0250365 A1 | 10/2007 | Chakrabarti | |
| 2007/0271039 A1* | 11/2007 | Ella et al. | 702/12 |
| 2008/0127205 A1* | 5/2008 | Barros | 719/313 |
| 2008/0162551 A1* | 7/2008 | Geyer et al. | 707/103 R |
| 2009/0172668 A1* | 7/2009 | Bobak et al. | 718/100 |
| 2009/0319529 A1* | 12/2009 | Bartlett et al. | 707/9 |

OTHER PUBLICATIONS

Office Action issued in Canadian Application No. 2,712,814 on May 28, 2015, 7 pages.
Office Action issued in Canadian Application No. 2,712,814 on Jun. 26, 2013, 7 pages.
Office Action issued in Canadian Application No. 2,712,814 on Sep. 18, 2012, 5 pages.
Combined Search and Examination Report issued in United Kingdom Application No. 1013441.9 on Dec. 7, 2010, 10 pages.
Examination Report issued in United Kingdom Application No. 1013441.9 on Oct. 5, 2011, 4 pages.
Examination Report issued in United Kingdom Application No. 1013441.9 on Dec. 15, 2011, 1 pg.

* cited by examiner

NODE TO NODE COLLABORATION

RELATED APPLICATIONS

This application claims the benefit of a related U.S. Provisional Application Ser. No. 61/233,178, filed Aug. 12, 2009, entitled "Peer to Peer Collaboration for a Seismic Application" to Norum, the disclosure of which is incorporated by reference herein in its entirety.

BACKGROUND

Computers can be used to create a variety of models from mere ideas or information associated with existing objects. For example, information associated with a hydrocarbon reservoir, such as seismic and/or well data, can be collected and used by a computer to create a model of the reservoir and any wells within the reservoir.

Often, running and interacting with such models can stretch the resources of an individual computer.

SUMMARY

Implementations of node to node collaboration are described. In one possible embodiment, one or more secondary nodes coupled to a primary node are identified. The secondary nodes can be coupled to the primary node, for example, via a peer to peer network. Resources associated with the one or more secondary nodes can be shared with the primary node to improve a performance of an oilfield services application being run at the primary node.

This summary is provided to introduce a selection of concepts that are further described below in the detailed description. This summary is not intended to identify key or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to techniques for implementing node to node collaboration. More particularly, the techniques described herein allow a primary node running on a computing device to identify one or more secondary nodes to which the primary node is coupled, and utilize resources associated with those secondary nodes.

For example, in one possible implementation a primary node, such as an oilfield services application running on a first computing device, can identify one or more secondary nodes running on computing devices coupled to the first computing device. The primary node can also asses resources, such as processing capacity, memory availability, communication bandwidth and/or speed, etc., available on the computing devices associated with the secondary nodes.

In one possible embodiment, the primary node can access historical data regarding past performance and/or capacity of the resources associated with the secondary nodes. Alternately, in another possible embodiment, the primary node can initiate tests to empirically determine the performance and/or capacity of resources associated with the secondary nodes.

The primary node can share with one or more of the secondary nodes operations needed to complete a workflow at the primary node. Shared operations can include any operations needed by a workflow, including accessing data from a secondary node, writing and/or caching data to a secondary node, outsourcing calculations to a secondary node, or any other operations known in the art. The term "data" as used herein can include seismic data, well data, or any other data known in the art.

For example, the primary node can assign computing intensive calculations to one or more secondary nodes having ample available processing capacity. Similarly, the primary node can request one or more secondary nodes with ample available memory to perform a memory intensive operation. In one implementation, an operation can include all or a portion of a workflow, such as an oilfield services application workflow (including an interactive workflow) and/or a batch job.

Oilfield services are any operations associated with hydrocarbon, carbon, or water discovery, location, tracking, production, transportation, storage, and/or sequestration. This includes the characterization and modeling of a reservoir or production operation, as well as the modeling of behavior of the reservoir or the production operation.

An earth model will be understood to include any model used within the oilfield services, mining, carbon sequestration, water location and/or water production industries. Earth models include various geological and/or geophysical data and models, reservoir models, pipe and production facility models, production well and injection well models, seismic models, microseismic models, and various interpretations of geological data and/or geophysical data, etc.

Similarly, it will be understood that the term oilfield services application as used herein includes any application configured to carry out an oilfield services operation and/or workflow, including applications that create or manipulate earth models or any other models useful in oilfield services operations. The term oilfield services application also includes any workflows useful for finding, locating, tracking or extracting hydrocarbons or other materials (including water) from reservoirs or geologic formations, including, for example, seismic processing and/or seismic interpretation workflows. In some instances, oilfield services applications can include workflows associated with the sequestration of materials, such as carbon, in reservoirs. Oilfield services applications can also include workflows configured to improve or optimize oilfield service operations.

Example Environment

Figure 1:
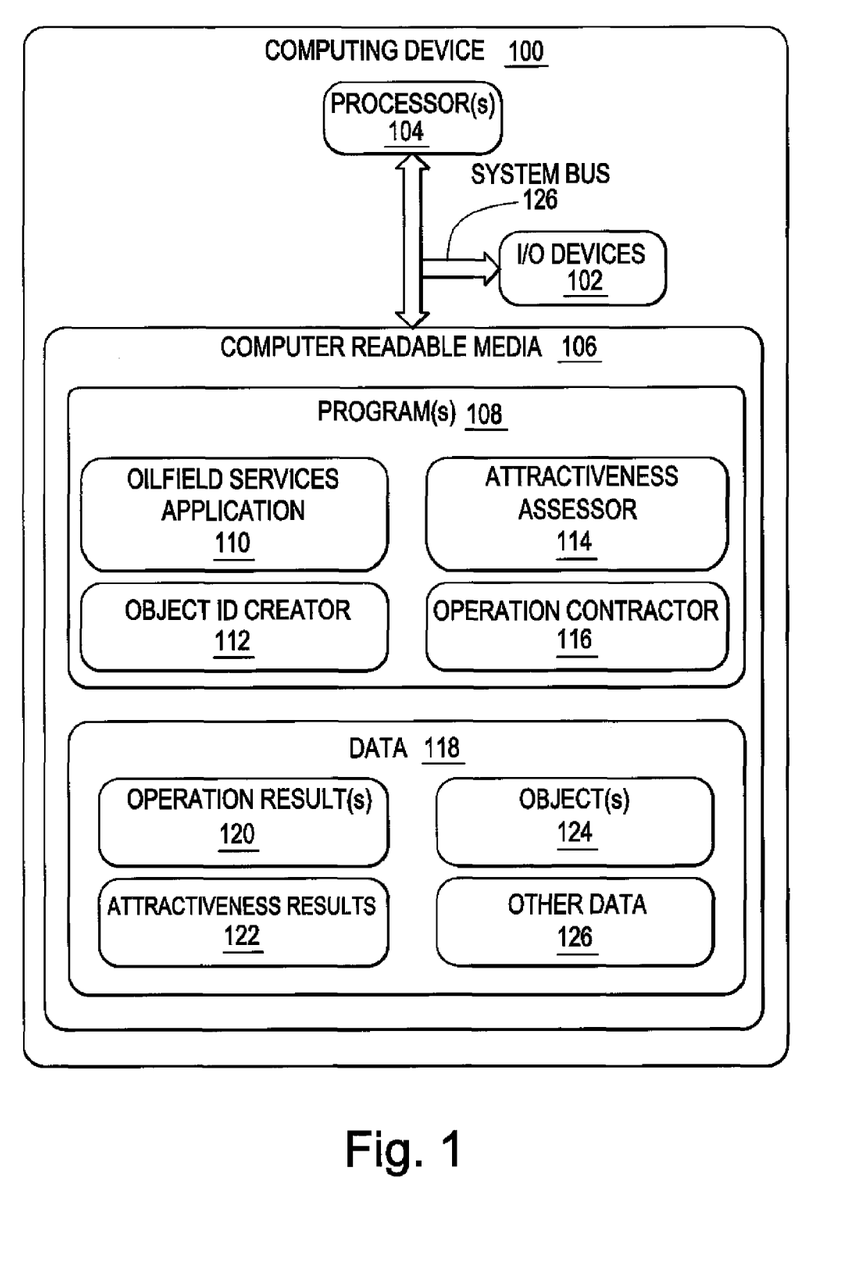
FIG. 1 illustrates an example computing device on which elements of node to node collaboration can be implemented.

FIG. 1 shows an example computing device 100 suitable for implementing embodiments of node to node collaboration. Computing device 100 can be implemented as any form of computing and/or electronic device. For example, computing device 100 can include a server, a desktop PC, a notebook or portable computer, a workstation, a mainframe computer, an Internet appliance and so on. Computing device 100 can include input/output (I/O) devices 102, one or more processor(s) 104, and computer-readable media 106.

I/O devices 102 can include any device over which data and/or instructions can be transmitted or received by computing device 100. For example, I/O devices 102 can include one or more of an optical disk drive, a USB device, a keyboard, a touch screen, a monitor, a mouse, a digitizer, a scanner, a track ball, etc.

I/O devices 102 can also include one or more communication interface(s) implemented as any of one or more of a serial and/or parallel interface, a wireless interface, any type of network interface, a modem, a network interface card, or any other type of communication interface capable of connecting computing device 100 to a network or to another computing or electrical device.

Processor(s) 104 include microprocessors, controllers, graphic processing unit(s) and the like configured to process various computer executable instructions controlling the operation of computing device 100. For example, processor(s) 104 can enable computing device 100 to communicate with other electronic and computing devices, and to process instructions and data in conjunction with programs 108 stored in computer-readable media 106.

Computer-readable media 106, can include one or more memory components including random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 106 provides storage mechanisms to store various information and/or data such as software applications and any other types of information and data related to operational aspects of computing device 100. For example, programs 108 stored on computer-readable media 106 can include an oilfield services (OFS) application 110, such as an application allowing for the creation, modification, and/or manipulation of an earth model (including, for example, a seismic processing application, a seismic interpretation application, a reservoir modeling application, a reservoir simulation application, a production application—such as from facilities and/or reservoirs—or any other OFS applications known in the art.

Programs 108 can additionally include an object identifier (ID) creator 112, a resource attractiveness assessor 114, an operation contractor 116, and other programs—such as an operating system and/or assorted application programs. Programs 108 can be executed on processor(s) 104. It will also be noted that some of the programs may be associated with one another, or may be subsets of one another. For example, object ID creator 112 could be a part of OFS application 110.

Computer-readable media 106 can also include data 118. For example, as illustrated in FIG. 1, data 118 residing on computer-readable media 106 can include operation results 120, resource attractiveness results 122, object(s) 124, and other data 126 (including intermediate and final data created through use of one or more of programs 108).

Any of programs 108 and data 118 can reside wholly or partially on any of a variety of media types found in computer-readable media 106. For example, portions of resource attractiveness assessor 114 can reside at different times in random access memory (RAM), read only memory (ROM), optical storage discs (such as CDs and DVDs), floppy disks, optical devices, flash devices, etc.

A system bus 128 can couple one or more of the processor(s) 104, I/O devices 102 and computer-readable media 106 to each other. System bus 128 can include one or more of any of several types of bus structures, including a memory bus or memory controller, a peripheral bus, an accelerated graphics port, and a processor or local bus using any of a variety of bus architectures. By way of example, such architectures can include a peripheral component interconnects (PCI) bus also known as a mezzanine bus, and so on.

Example Computing Device Network

Figure 2:
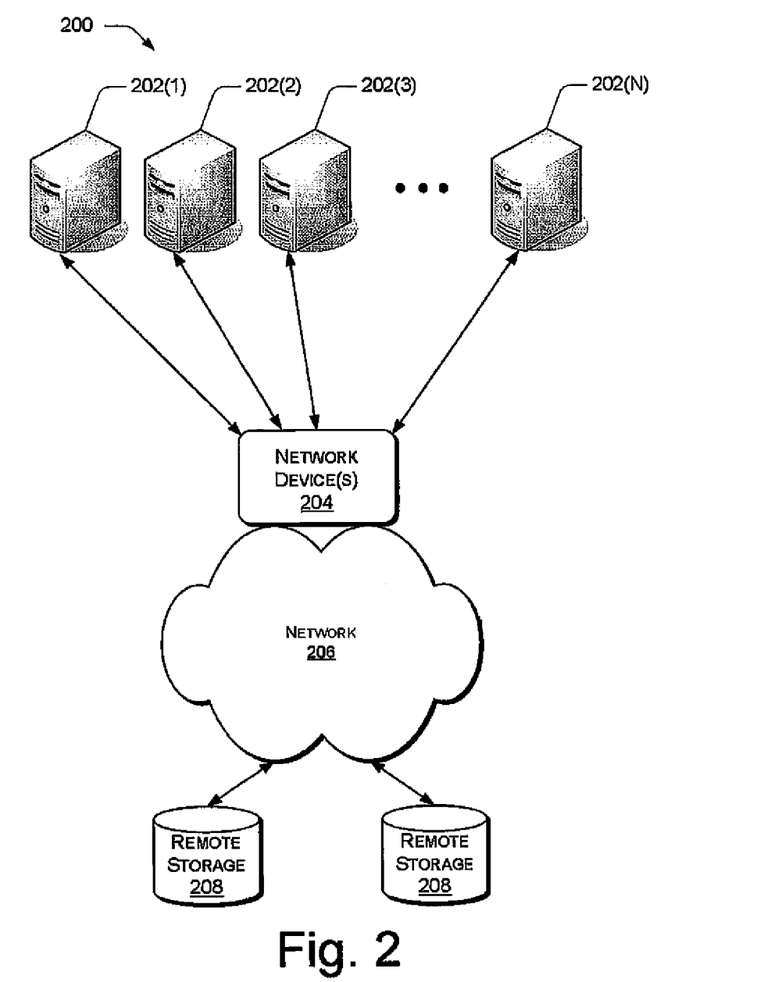
FIG. 2 illustrates an example network in which a plurality of computing devices are electronically coupled in accordance with one embodiment of node to node collaboration.

FIG. 2 illustrates an example network 200 in which a plurality of computing devices 202(1)-202(N) are electronically coupled in accordance with one embodiment of node to node collaboration. Computing devices 202 can include any computing devices known in the art, including computing device 100, and any number N of computing devices 202 can be present in network 200. Moreover, it will be understood that individual computing devices 202 can have different capabilities and resources than other computing devices in network 200.

Computing devices 202 can be coupled to one another via one or more network device(s) 204, such as servers, workstations, network switches, routers or any other computing devices known in the art configured to place computing devices 202 in electronic communication. Network device(s) 204 can be part of a public or private network 206 to which one or more remote storage units 208 or other devices and or resources can be coupled.

For example, network device(s) 204 can be part of a corporate network connecting computing devices 202 found in a single room. Alternately, network device(s) 204 can be part of a corporate network connecting computing devices 202 found in various buildings internationally. Still further, network device(s) 204 can be part of a corporate network connecting computing devices 202 found in a single room with other computing devices 202 found in other buildings and/or geographic locations.

In one possible implementation, network device(s) 204 can act as an access point to the Internet.

In general, it will be understood that network 200 as illustrated in FIG. 2 can include any configuration in which computing devices 202 can be placed into communication with one another indirectly through use of one or more network device(s) 204.

Example Computing Device Network

Figure 3:
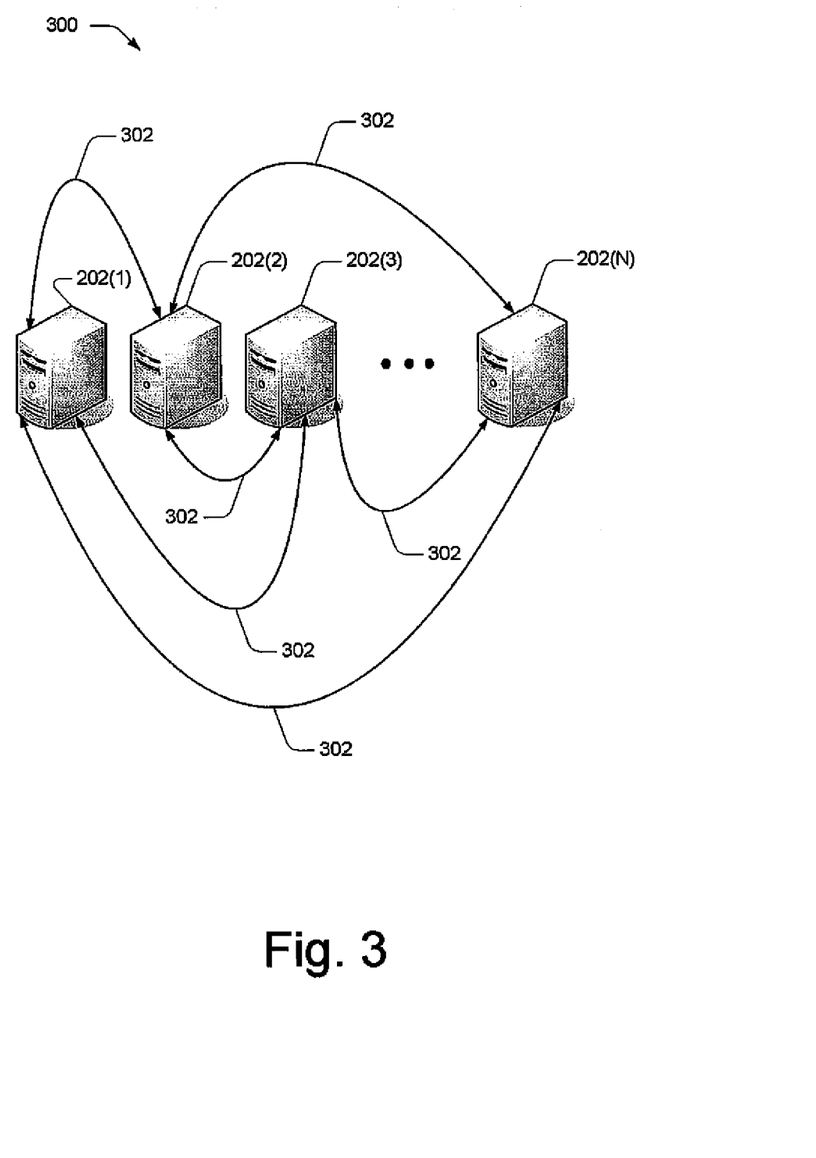
FIG. 3 illustrates an example network in which a plurality of computing devices are electronically coupled in accordance with one embodiment of node to node collaboration.

FIG. 3 illustrates another possible type of network 300 in which aspects of node to node communication can be implemented. As shown, computing devices 202(1)-202(N) are connected directly to each other through connections 302, which can include any physical or wireless technologies known in the art capable of facilitating communication between computing devices 202(1)-202(N).

It will be understood that any number N of computing devices 202 can be included in network 300. It will also be understood that not all of computing devices 202 need be connected directly to one another. For example, any number of connections 302 could be left out, precluding the direct communication between any number of individual computing devices 202. In such an instance, the computing devices 202 could communicate with each other indirectly, via one or more other computing devices 202. For example, if computing devices 202(1) and 202(3) aren't directly coupled to one another, in one possible implementation they can communicate with one another through either or both of computing devices 202(2) and 2020(N).

It will also be understood that elements of networks 300 and 200 can be combined in any possible composite configuration to facilitate node to node and indirect communication. For example, computing devices 202(1) and 202(2) can communicate directly via a connection 302, while one or more of computing devices 202(1) and 202(2) may communicate indirectly with computing device 202(3) via network device 204. Similarly, all or some of computing devices 202 can enjoy multiple connections. For example, continuing the above example, computing devices 202(1) and 202(2) can communicate directly via a connection 302, while also communicating indirectly with other computing devices 202 (and/or with each other) via network device 204.

Therefore, it will be understood that computing devices 202(1)-202(N) can be coupled in any ways known in the art.

Example Computing Device

Figure 4:
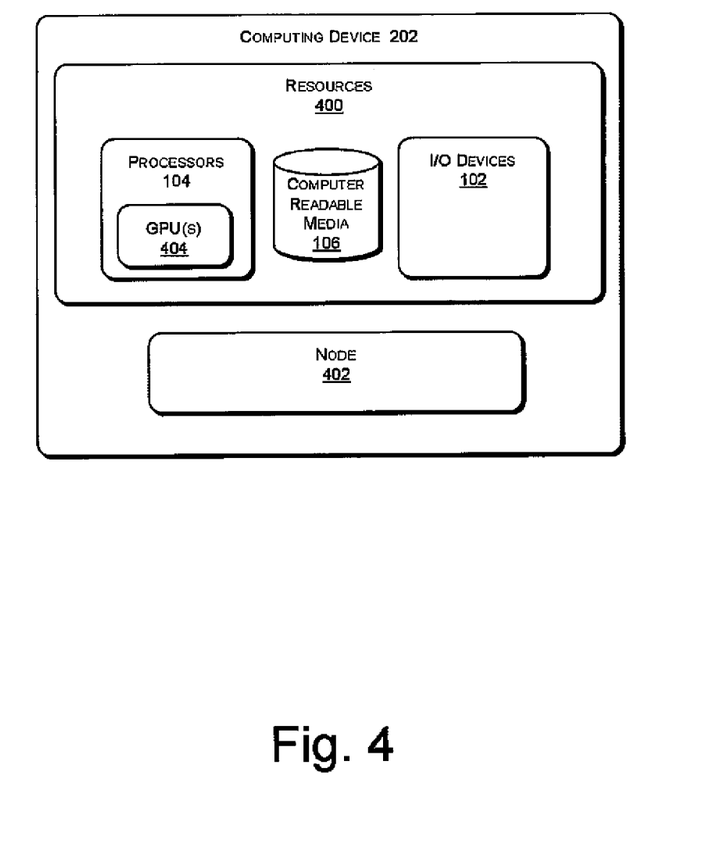
FIG. 4 illustrates an example computing device on which elements of node to node collaboration can be implemented.

FIG. 4 illustrates a computing device 202 suitable for implementing embodiments of node to node collaboration. In one possible implementation, computing device 202 represents, in a simplified manner, computing device 100.

As shown, computing device 202 includes resources 400 and a node 402. Resources 400 include processors 104 (including one or more graphic processing units (GPUs) 404), computer-readable media 106, and I/O devices 102.

In one possible embodiment, different computing devices 202 used in embodiments of node to node communication may enjoy different levels of resources 400. For example, computing device 202(1) may enjoy more memory, or faster memory, than computing devices 202(2) and 202(3). Alternately, or additionally, computing device 202(1) may enjoy processing advantages over computing devices 202(2) and 202(3). For instance, computing device 202(1) may have more processing capacity, more processing speed, a greater number of GPUs, etc., than do other computing devices 202 in networks 200, 300.

Similarly, the various computing devices 202 in networks 200, 300 may have different communication capabilities and capacities. For example, computing device 202(N) may have more available, and/or better quality, I/O devices 102 than other computing devices 202 in networks 200, 300. Similarly, a strong connection 302 between devices 202(2) and 202(N) may allow device 202(N) to communicate more quickly, or communicate more information in the same amount of time, with computing device 202(2) than might be possible between computing device 202(1) and computing device 202(2).

Node 402 can be any application running on computing device 202, such as, for example, an end user application. In one possible implementation, node 402 includes an oilfield services application, such as oilfield service application 110. Node 402 can be a self governing node, i.e. each node 402 in node to node collaboration may prioritize its own operations, and may choose to opt out of sharing of resources 400 at any instant.

In one possible embodiment, a primary node 402 running on a computing device 202 can detect one or more secondary nodes 402 running on other computing devices 202 coupled to the computing device 202 on which the primary node 402 is running. Primary node 402 can evaluate the available resources 400 on the other computing devices 202 associated with the secondary nodes 402 and develop a plan for improving, or optimizing, an operation being run on the primary node 402 by leveraging resources 400 on the computing devices 202 associated with the secondary nodes 402.

In one implementation, the detection of other nodes 402 and the evaluation and sharing of resources 400 associated with secondary nodes 402, can be done automatically by the primary node 402, and be completely transparent to a user at the computing device 202 associated with primary node 402. Similarly, some or all of this process can be transparent to users at one or more of the computing devices 202 associated with secondary nodes 402 which may be sharing resources 400 with the primary node 402.

In another possible implementation, a plan to leverage resources 400 may be presented to a user at the computing device 202 associated with the primary node 402. In one possible aspect, the user may be given an option to agree with the plan, or alter it in any way known in the art.

For example, the user may be able to veto interaction with given computing devices 202, or veto the sharing of specified resources associated with certain computing devices 202.

Similarly, users at computing devices 202 associated with secondary nodes 402 may be alerted to a sharing plan formulated by a primary node 402 and be given an opportunity to allow or deny access to the resources 400 associated with their computing devices 202. Or, the users may be given the opportunity to allow sharing of resources 400 but on a lesser or different scale than that proposed in the sharing plan.

It is also possible that presets can be entered at secondary nodes 402, notifying primary nodes 402 of a maximum of resources which might be sharable in a sharing situation. For example, a user who often runs memory intensive applications on his computing device 202 may reserve a certain amount of memory for his exclusive use and prohibit any of this reserved memory from being shared. In this way the user can ensure a given level of performance at his computing device 202.

Similarly, in another possible example, a user who often runs processing intensive applications on his computing device 202 may reserve a certain amount of processing resources, such as processors 104, for his exclusive use and prohibit any of this reserved resource from being shared.

In one possible implementation, a ranking of nodes 402 may exist. For example, a node 402 being run on a supervisor's computing device 202 may be given higher priority to leverage resources 400 associated with secondary nodes 402 than would a primary node 402 being run on a computing device 202 operated by one of the supervisor's subordinates. Such a ranking can be formulated in any way known in the art with any of a number of degrees of priority. This ranking can be transparent to users, or it can be displayed and potentially even altered by users on the fly.

Alternately, in another possible implementation, operations being run at nodes 402 may be prioritized. For example, a node 402 running an operation deemed as critical or otherwise important, may be granted primary status and allowed priority in leveraging resources 400 of other nodes 402 in networks 200, 300.

Such priority status may be dynamic. That is, once predetermined critical steps in the operation are completed, the status of the primary node 402 running the operation may be downgraded, allowing for operations being run on other nodes 402 with as yet unfinished steps to attain a relatively higher primary node 402 status with a higher priority to leverage resources 400 in networks 200, 300.

In one possible implementation, a primary node 402 can develop a resource 400 sharing plan to optimize the running of an operation on a computing device 202 associated with the primary node 402.

Alternately, the primary node 402 can develop a resource sharing plan to improve or optimize use of some or all of resources 400 in networks 200, 300. For example, the primary node 402 may assign cumbersome batch jobs to resources 400 having poor communication resources, while assigning interactive tasks to resources 400 having good communication resources. In one aspect, the primary node 402 may communicate with other nodes 402 to accomplish such an improved or optimized use of resources 400 in networks 200, 300.

In still another possible implementation, the primary node 402 can develop a resource sharing plan to improve or optimize a function and/or functioning of one or more operations being run on nodes 402 across networks 200, 300. In one aspect, the primary node 402 may communicate with other nodes 402 to accomplish such an improvement or optimization.

In addition to initially detecting other nodes 402 and their corresponding resources 400 in networks 200, 300, each node in networks 200, 300 can also reevaluate the resources 400 of some or all of the other nodes 402. For example, on the fly, at preset intervals, or after completion of operations or subsets thereof, a node 402 may reevaluate the available resources 400 on one more computing devices 202 in networks 200, 300. In this way the node 402 can detect when computing devices 202 or resources 400 are removed from, or introduced to, the networks 200, 300. Similarly the node 402 can detect when resources 400 of various computing devices 200 in networks 200, 300 have degraded, are in use by other nodes 402 or applications, or have been restricted from use by user interaction or by automatic functionality.

A node 402 can also keep a record of a performance of resources 400 associated with other nodes 402 in networks 200, 300 and refer to this record before the creation of resource 400 sharing plans in the future. For example, if a bandwidth or speed of a connection between a primary node 402 and a secondary node 402 was poor on a previous attempt at leveraging the resources 400 associated with the secondary node 402, a record of this will be kept at the primary node 402. In one implementation, this can result in a downgrading of an attractiveness of the resources 400 associated with the secondary node 402. In one implementation, such records can be created by attractiveness assessor 114 and be stored in attractiveness results 122.

The terms "primary" and "secondary" are used herein for the sake of organizational clarity, with a primary node 402 being any node 402 running an operation, such as a workflow. Similarly, the term "secondary" node 402 means any node 402 coupled to the computing device 202 associated with the primary node 402 and having resources 400 that the primary node 402 might like to make use of.

For example, computing device 202(1) may be running an operation, and node 402 on computing device 202(1) may detect nodes 402 on computing devices 202(2)-(N). In such a configuration, node 402 associated with computing device 202(1) can be considered the primary node, and the nodes 402 associated with the other computing devices 202(2)-(N) can be considered secondary nodes.

In one possible embodiment, any node 402 associated with any of computing devices 202 running an operation can be considered a primary mode. Moreover, more than one primary node 402 may exist in networks 200, 300.

Returning to the example above, it's possible that as primary node 402 associated with computing device 202(1) is running an operation, another node 402 in networks 200, 300 (such as node 402 associated with computing device 202(3)) may be running another operation and wish to share resources 400 with computing device 202(1). In such a case, node 402 associated with computing device 202(1) may simultaneously be a primary node 402 with regard to the operation running primarily on computing device 202(1), and a secondary node with regard to the other operation running primarily on computing device 202(3). Therefore, it will be understood that each node 402 in networks 200, 300 can simultaneously be a primary node and a secondary node.

It will also be understood that more than one node 402 may be associated with each computing device 202. For example, two self-governing nodes 402 (e.g. a primary node and a secondary node, or two secondary nodes) can be associated with the same computing device 202. In one implementation such nodes 402 can be assigned separate parts of the same computing device 202 (e.g. separate processing capacities.). Such nodes 402 could communicate with each other as normal (i.e. using a network connection), or the nodes 402 could use communication within the computing device 202 (such as optimized and/or direct communication within the computing device 202).

In addition to the types of resources leveraging described above, it will also be understood that any other resource 400 sharing efforts known in the art can be contemplated and effectuated in node to node collaboration.

Subcontracting

In one possible implementation, a primary node 402 may subcontract resource leveraging efforts to another node 402. For example, an operation contractor 116 at primary node 402 may identify several portions of an operation and direct another node 402 in network 200 300 to identify suitable resources 400 in networks 200, 300 to which the portions of the operation may be sent. The subcontracted node 402 may then send the portions of the operation to the secondary nodes 402 and direct the secondary nodes 402 to send the results of the portions of the operation to the primary node 402. Alternately, the subcontracted node 402 may itself receive the results from the secondary nodes 402, and direct the results to the primary node 402. In one implementation, the subcontracted node 402 will modify or package the results, for ease of processing or to improve a usefulness of the results, before sending the results on to the primary node 402.

Redundant leveraging of resources 400 may also be conducted. For example, a primary node 402 may send the same task to two or more secondary nodes 402 and accept the first completed result to be returned to the primary node 402. Similarly, the primary node 402 may itself perform the task, and use its own result if it is completed at the primary node 402 before a result of the task is received from a secondary node 402. Such behavior of the primary node 402 can be used to hedge against unexpected delays in resource 400 leveraging from the secondary nodes 402, such as would be experienced when communication with the one of more secondary nodes 402 is lost.

Moreover, redundant leveraging of resources 400 can be used to improve a robustness of an oilfield services application 110 being run by a user at the primary node 402 and/or a robustness of node to node collaboration. For example, a self governing secondary node 402 may disregard, fail to perform a task, fail to deliver results of a task in a timely manner, or fail to deliver some or all of the results of a task sent to it by a primary node 402. In such a case, some or all ill effects of resource sharing failures with secondary nodes 402 may be ameliorated by either or both of (1) the primary node 402 performing the task using its own resources 400, or (2) the use of resources 400 of other secondary nodes 402. In one possible embodiment, primary node 402 can initiate performance of a task at or near a moment when the primary node 402 redundantly shares the task with one or more secondary nodes 402.

Object Caching

Node to node collaboration can also be used to cache objects, such as objects 124 (which can include operation results 120), at various locations in networks 200, 300. In such a manner, recall of such objects can be accelerated. Similarly, node to node collaboration can also be used to access and/or leverage cached objects created at other nodes in networks 200, 300, such as objects created by instances of OFS application 110 running at the other nodes. Objects can include any data and/or commands that might be useful to a node 402.

For example, a primary node 402 can periodically effect caching of objects corresponding to completed operations, or operations in progress, at various computing devices 202 associated with nodes 402 in networks 200, 300. In one possible embodiment, the primary node 402 can request that an object be cached at one or more secondary nodes 402.

Alternately, the primary node 402 can access and/or leverage objects which have been previously cached at the one or more secondary nodes 402. In one implementation, the primary node 402 can access and/or leverage an object produced by the one or more secondary nodes 402 (for example when instances of OFS application 100, or other local applications, running on the one or more secondary nodes 402 have created the object at the one or more secondary nodes 402). In one possible embodiment, such caching of objects can be done automatically by the one or more secondary nodes 402, with no input or direction from the primary node.

In another possible implementation, the primary node 402 can access and/or leverage an object originating from another source, such as from remote storage 208, which has been cached at the one or more secondary nodes 402. In one possible embodiment, such caching of objects can be done automatically by the one or more secondary nodes 402, with no input or direction from the primary node 402.

In one possible aspect, an object cached on a secondary node 402 can be leveraged in an operation outsourced to the secondary node 402 by the primary node. Local availability of the object on the secondary node 402 can speed up completion of the operation and hasten delivery of a result of the operation to the primary node 402. In one possible embodiment, a presence of such a cached object useful to an operation at the secondary node 402, can increase an attractiveness of the secondary node 402 as a potential node to which the operation can be outsourced by the primary node 402.

Similarly, the primary node 402 can itself cache an object using its own associated resources 400, such as, for instance, when the primary node 402 has produced the object, modified the object, or received the object from a secondary node 402. Such an object can be leveraged subsequently in node to node collaboration.

In one implementation, such an object may be leveraged by OFS application 110, such as, for example, when an object cached by a secondary node 402 is used by OFS application 110 on the secondary node 402.

In one possible implementation, the objects are assigned a unique object identifier (ID) for ease of future reference. Object IDs can be created by object ID creator 112.

When needed, cached objects can be accessed from the various computing devices 202 associated with secondary nodes 402, for example, by referring to their unique object IDs. In one possible implementation, these objects can be accessed more quickly from the various computing devices 202 associated with secondary nodes 402 than they could be accessed from remote storage, such as remote storage 208.

In one implementation, objects cached on a secondary node 402 can be accessed from the secondary node 402 to decrease resource contention issues which otherwise might be encountered if the same object was accessed from a remote resource, such as remote storage 208. Similarly, in another possible implementation, objects cached on a secondary node 402 can be accessed from the secondary node 402 when such access can be done more quickly than attempting to access the same object from a remote resource, such as remote storage 208.

EXAMPLE METHODS

Figure 5:
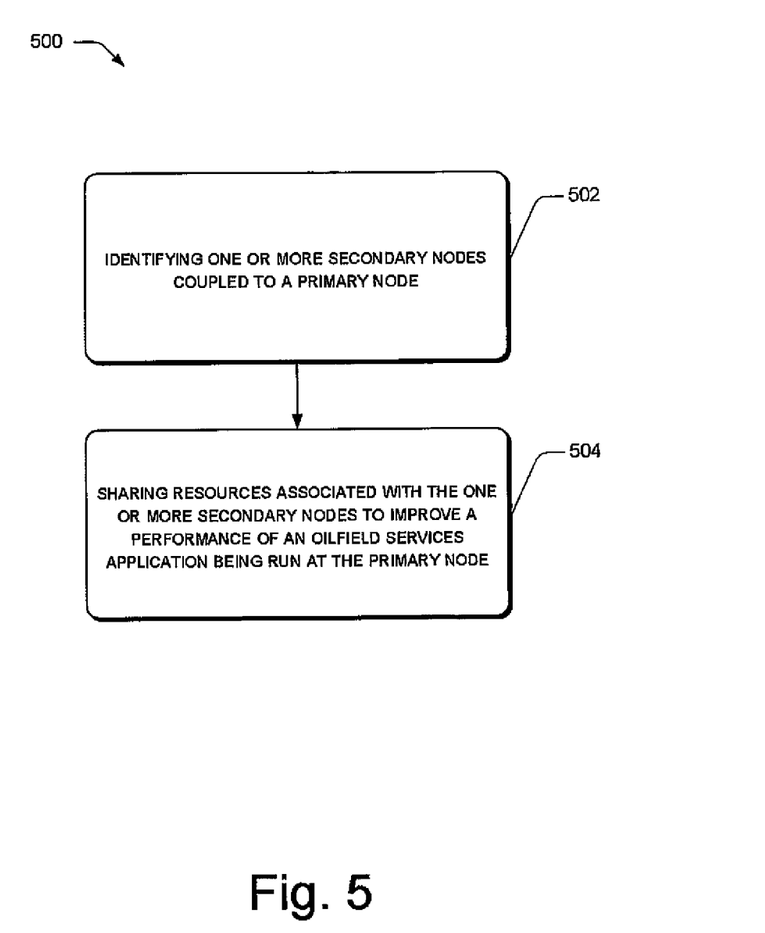
FIG. 5 illustrates example method(s) of node to node collaboration.
Figure 6:
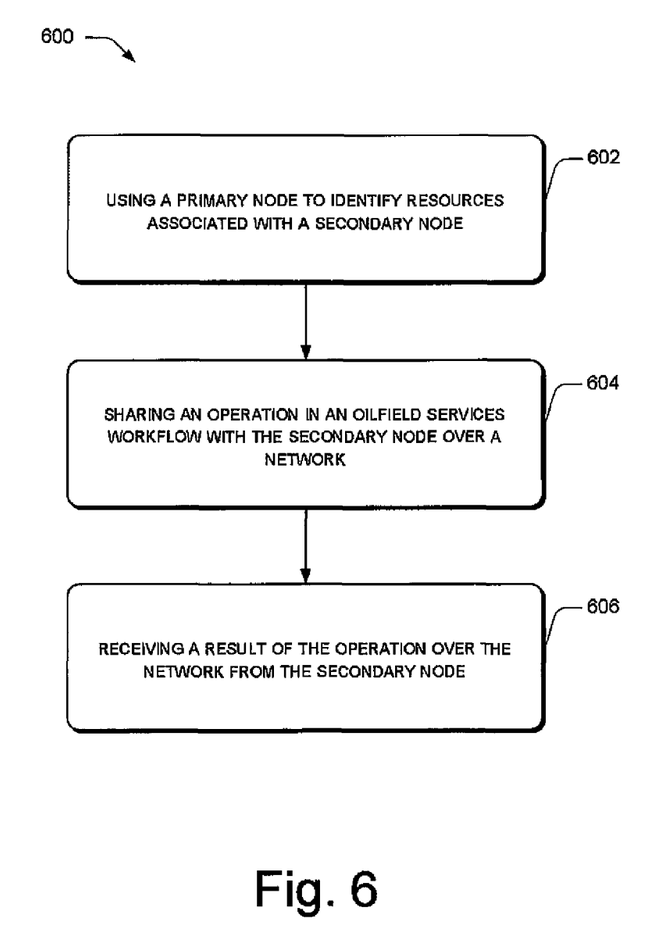
FIG. 6 illustrates example method(s) of node to node collaboration.
Figure 7:
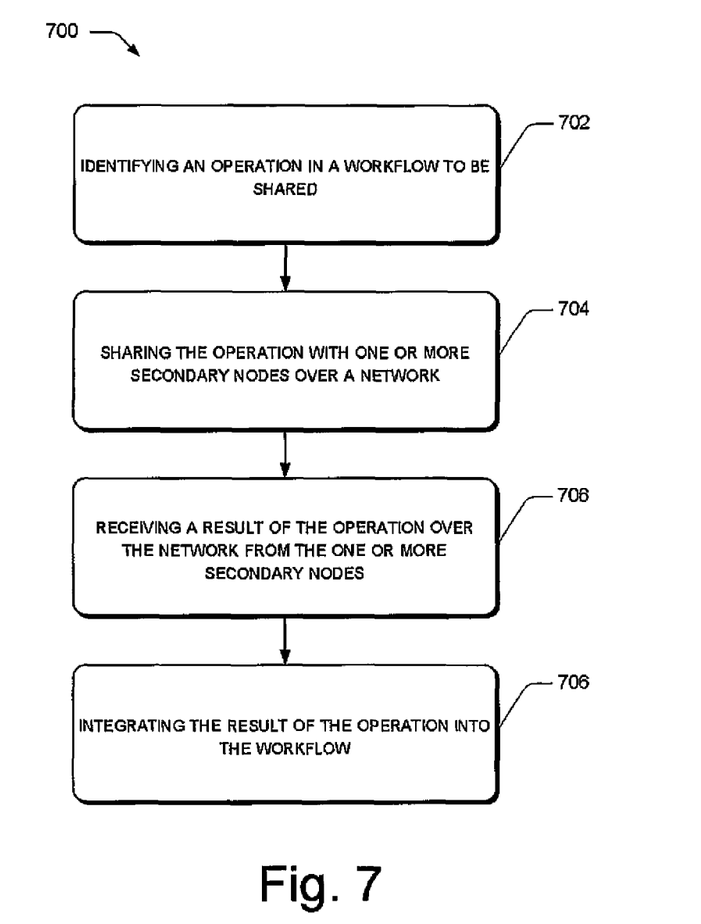
FIG. 7 illustrates example method(s) of node to node collaboration.

FIGS. 5-7 illustrate example methods for implementing aspects of node to node collaboration. The methods are illustrated as a collection of blocks in a logical flow graph representing a sequence of operations that can be implemented in hardware, software, firmware, various logic or any combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described therein. In the context of software, the blocks can represent computer instructions that, when executed by one or more processors, perform the recited operations. Moreover, for discussion purposes, and not purposes of limitation, selected aspects of the methods may described with reference to elements shown in FIGS. 1-4.

Example Method I

FIG. 5 illustrates an example method 500 for implementing node to node collaboration.

At block 502, one or more secondary nodes coupled to a primary node are identified by the primary node. In one implementation, the nodes can be nodes 402. The secondary nodes can be coupled to the primary node directly, such as, for example, though connections 302 in a peer to peer network. Alternately, the secondary nodes can be connected to the primary node indirectly, such as, for example, via network devices (including potentially network devices 204) or via intermediary nodes. In yet another implementation, the secondary nodes can be connected to the primary node and/or one another via any possible combination of direct and indirect connections.

At block 504 resources, such as resources 400, associated with the one or more secondary nodes are shared with the primary node to improve a performance of an oilfield services application, such as oilfield services application 110, being run at the primary node.

For example, the primary node may make use of processing power available at one or more of the secondary nodes to run a task in a particular workflow or operation. The primary node may also use available memory associated with one or more of the secondary nodes to store objects, such as objects 124, that the primary node may need later. Objects can be associated with unique object IDs to facilitate recall of the objects as they are needed by the primary node.

In one possible implementation, communication properties between the primary node and the one or more secondary nodes can be evaluated, and secondary nodes with poor communicating properties can be earmarked as nodes to receive batch jobs, while nodes with good communicating properties can be earmarked as nodes to receive interactive tasks.

Example Method II

FIG. 6 illustrates another example method 600 for implementing node to node collaboration. At block 602 a primary node identifies resources, such as resources 400, associated with a secondary node. In one implementation, the nodes can include nodes 402.

The primary and secondary nodes can be connected directly, such as via a peer to peer network, such as network 300, or indirectly such as through a network 200. Alternately, the nodes can be connected via a combination of direct and indirect connections.

At block 604 an operation in an oilfield services application workflow is shared with the secondary node over a network. For example, the primary node may recognize one or more resources available at a computing device associated with the secondary node and develop a resource sharing plan to leverage some or all of those resources. In one implementation this could, for example, include leveraging processor resources associated with the secondary node to perform processor intensive operations from the oilfield services workflow.

At block 606 a result of the operation is received over the network from the secondary node. In one implementation the primary node may perform the operation using its own resources and accept the first result it receives (i.e. the result it prepares, or the result prepared at the resources associated with the secondary node, whichever arrives at the primary node first).

Example Method III

FIG. 7 illustrates another example method 700 for implementing node to node collaboration.

At block 702 an operation in a workflow to be shared is identified. In one implementation this can include an operation associated with an oilfield services application.

The operation can be identified based on a variety of factors, including an importance of the operation and/or an amount of overhead the operation might require. For instance, if the operation requires significant processing resources, it may be earmarked for sharing—especially if processing resources are available at identified secondary nodes.

In one implementation, operations can be identified for sharing if they might otherwise slow down or complicate a workflow if they are not shared.

In another possible implementation, operations to be shared can identified based on available resources identified at secondary nodes. For example, if available memory associated with a secondary node is identified, memory intensive operations may be identified for sharing to make use of the available memory.

In another possible implementation, operations are identified for sharing to improve or optimize a functioning of the workflow.

In yet another possible implementation, operations are identified for sharing on the basis of improving or optimizing either a use of available resources in a network, or to improve or optimize the handling of one or more workflows being processed on computing devices in the network.

At block 704, the operation is shared with one or more secondary nodes over a network. In one implementation, the operation can be shared redundantly (i.e. the operation may be sent to more than one secondary node for processing). For example, the same operation can be sent to two or more secondary nodes for separate processing at those nodes. Alternately, or additionally, the operation may also be redundantly shared by sending it to one or more secondary nodes while also performing the operation at a primary node.

The network may include direct connections between the secondary nodes and a primary node (such as through a peer to peer network), or it may include indirect connections, or any combination thereof.

In one possible implementation secondary nodes can be rated based on past performance. Thus secondary nodes which perform well and return good results quickly and/or consistently can be rated higher than secondary nodes which perform more slowly or erratically. Secondary nodes to which the operation can be sent can be chosen on the basis of such ratings.

At block 706 a result of the operation is received over the network from the one or more secondary nodes. In the case of redundant sharing, the result can be received from several secondary nodes.

At block 708 the result of the operation can be integrated into the workflow. If several results are received in a redundant sharing arrangement, in one possible implementation, the first result received can be integrated into the workflow (even if the first result comes from the primary node). In such an instance, if secondary node ratings are collected, any secondary node sending the first received result can receive a corresponding positive rating, or an increase in its existing rating. The other secondary nodes to which the operation was sent can receive corresponding ratings based on when their results were received. For example, secondary nodes from which no results were received, or from which results were received long after the first result was received, can be given a negative rating, or can have their existing ratings correspondingly diminished. In one implementation, diminished ratings can make secondary nodes less attractive for future operation sharing.

In one possible embodiment, any of the methods described above can be done transparently without any user involvement and/or knowledge. In such an embodiment a user at the primary node may be able to run an oilfield services application and enjoy one or more benefits of node to node collaboration without ever knowing that such collaboration is occurring.

Conclusion

Although embodiments of node to node collaboration have been described in language specific to structural features and/or methods, it is to be understood that the subject of the appended claims is not necessarily limited to the specific features or methods described. Rather, the specific features and methods are disclosed as example implementations of node to node collaboration.

What is claimed is:

1. A computer-implemented method of allowing a primary node to utilize node to node collaboration to improve a performance of a computer generated earth model, comprising:
   identifying an operation in a workflow to be shared,
      wherein the workflow comprises modeling a reservoir, a production operation, or both, by running an oilfield services application;

assessing, using a computing device, an attractiveness of sharing the operation with at least one of one or more secondary nodes based at least partially on a presence of an object associated with the workflow cached on the at least one of the one or more secondary nodes by the primary node, wherein assessing the attractiveness of sharing the operation with at least one of one or more secondary nodes comprises ranking a plurality of secondary nodes based at least in part on one or more resources available to the respective secondary nodes, and wherein the one or more resources are selected from the group consisting of processing capacity, memory availability, communication bandwidth, and communication speed;

assigning an object identifier to the object, wherein assessing the attractiveness of sharing the operation with at least one of one or more secondary nodes further comprises identifying a resource associated with the at least one of the one or more secondary nodes using the object identifier;

selecting at least one selected secondary node from the one or more secondary nodes based partially on whether the object is cached on the at least one of the one or more secondary nodes by the primary node, and based partially on the ranking of the plurality of secondary nodes;

sharing the operation with the at least one selected secondary node over a network;

splitting, by operation of the at least one selected secondary node, the operation shared therewith into two or more portions;

transmitting at least one of the two or more portions to another one of the one or more secondary nodes of the network, for execution;

receiving a result of the operation over the network from the at least one selected secondary node; and integrating the result of the operation into the workflow, wherein the primary node and the plurality of secondary nodes are configured to execute in parallel, such that the primary node is capable of being one of the plurality of secondary nodes, and at least one of the plurality of secondary nodes is capable of being the primary node.

2. The method of claim 1, further comprising:
caching, using the primary node, the object associated with the workflow on a workstation associated with the one or more secondary nodes.

3. The method of claim 1, further comprising:
leveraging the object associated with the workflow using the at least one selected secondary node.

4. The method of claim 1, wherein the at least one selected secondary node uses the object to perform at least a portion of the operation.

5. The method of claim 1, wherein sharing includes transmitting the operation to the at least one selected secondary node, and wherein receiving includes receiving the result of the operation transmitted from the at least one selected secondary node.

6. The method of claim 5, further comprising:
assessing positively the attractiveness of sharing the operation with at least one of the one or more secondary nodes from which the result of the operation is timely received.

7. A non-transitory computer-readable medium having a set of computer-readable instructions residing thereon that, when executed, direct a processor to initiate acts comprising:
using a primary node to identify one or more resources associated with one or more secondary nodes;
assigning an object identifier to an object associated with an operation in an oilfield services workflow;
caching, using the primary node, the object on the one or more resources associated with at least one of the one or more secondary nodes, wherein the oilfield services workflow comprises modeling a reservoir, a production operation, or both, by operation of an oilfield services application;
assessing the one or more resources associated with the one or more secondary nodes, comprising determining whether the object was cached by the primary node and is present on the one or more resources associated with the one or more secondary nodes, and ranking a plurality of secondary nodes based at least in part on one or more resources available to the respective secondary nodes, wherein the one or more resources are selected from the group consisting of processing capacity, memory availability, communication bandwidth, and communication speed,
wherein assessing the attractiveness of sharing the operation with at least one of one or more secondary nodes further comprises identifying a resource associated with the at least one of the one or more secondary nodes using the object identifier;
selecting at least one selected secondary node from among the one or more secondary nodes based partially on determining that the object was cached by the primary node and is present on the one or more resources associated with the one or more secondary nodes, and based partially on the ranking of the plurality of secondary nodes;
sharing the operation with the at least one selected secondary node over a network, wherein sharing comprises transmitting, to the at least one selected secondary node, instructions for performing the operation, the primary node and the at least one selected secondary node being part of the network, wherein the sharing is based at least partially on the assessment of the one or more resources associated with the one or more secondary nodes;
splitting, by operation of the at least one selected secondary node, the operation shared therewith into two or more portions;
transmitting at least one of the two or more portions to another one of the one or more secondary nodes for execution; and
receiving a result of the operation over the network from the at least one selected secondary node,
wherein the primary node and the plurality of secondary nodes are configured to execute in parallel, such that the primary node is capable of being one of the plurality of secondary nodes, and at least one of the plurality of secondary nodes is capable of being the primary node.

8. The computer-readable medium of claim 7, wherein the acts further comprise:
sharing the operation in the oilfield services application workflow with the at least one of the one or more secondary nodes over a peer to peer network.

9. The computer-readable medium of claim 7, wherein the acts further comprise:
identifying a communication capacity as one of the one or more resources of the one or more secondary nodes.

10. The computer-readable medium of claim 7, wherein the acts further comprise:
integrating the result of the operation received from the at least one selected secondary node into the oilfield services application workflow.

11. The computer-readable medium of claim 7, wherein the acts further comprise:

leveraging the object cached on resources associated with the at least one selected secondary node.

12. The computer-readable medium of claim 7, wherein the acts further comprise:
querying for the object stored in memory associated with at least one of the one or more secondary nodes.

13. The computer-readable medium of claim 7, wherein selecting at least one selected secondary node further comprises:
identifying the at least one selected secondary node such that a user experience at the primary node can be improved by sharing resources associated with the at least one selected secondary node.

* * * * *